US009925691B2

United States Patent
Miyanaga

(10) Patent No.: US 9,925,691 B2
(45) Date of Patent: Mar. 27, 2018

(54) DRILL BIT

(71) Applicant: KABUSHIKI KAISHA MIYANAGA, Miki-shi, Hyogo (JP)

(72) Inventor: Masaaki Miyanaga, Miki (JP)

(73) Assignee: KABUSHIKI KAISHA MIYANAGA, Miki-shi, Hyogo (JP)

( * ) Notice: Subject to any disclaimer, the term of this patent is extended or adjusted under 35 U.S.C. 154(b) by 0 days.

(21) Appl. No.: 15/114,286

(22) PCT Filed: Mar. 30, 2015

(86) PCT No.: PCT/JP2015/001837
§ 371 (c)(1),
(2) Date: Jul. 26, 2016

(87) PCT Pub. No.: WO2015/159493
PCT Pub. Date: Oct. 22, 2015

(65) Prior Publication Data
US 2017/0001335 A1    Jan. 5, 2017

(30) Foreign Application Priority Data
Apr. 15, 2014 (JP) .................................. 2014-083837

(51) Int. Cl.
*B25D 17/20* (2006.01)
*B28D 1/14* (2006.01)
(Continued)

(52) U.S. Cl.
CPC .............. *B28D 1/146* (2013.01); *B23B 51/02* (2013.01); *B23B 51/06* (2013.01); *B25D 17/02* (2013.01);
(Continued)

(58) Field of Classification Search
CPC .... B23B 2251/68; B28D 1/146; B25D 17/02; B25D 17/20
(Continued)

(56) References Cited

U.S. PATENT DOCUMENTS 291,568 A * 1/1884 Borshardt ............... E21B 21/02
175/207
1,136,987 A * 4/1915 Wakfer ................... E21B 10/58
175/415
(Continued)

FOREIGN PATENT DOCUMENTS

CN      1199358 A    11/1998
CN   202607847 U    12/2012
(Continued)

OTHER PUBLICATIONS

Office Action issued in Chinese Patent Application No. 2015800036129, dated Dec. 29, 2016.
(Continued)

*Primary Examiner* — Daniel Howell
(74) *Attorney, Agent, or Firm* — Marshall, Gerstein & Borun LLP

(57) ABSTRACT

A drill bit includes a pointed head and a bit shaft. A dust suction passage is formed in the bit shaft. A hole with an opening is formed in the pointed head or in a portion of the bit shaft, the portion being near a distal end of the bit shaft. The bit shaft includes a first portion, the first portion including a core and a rib. The core extends in an axial direction, and is thinner than the pointed head. The rib protrudes radially outward from a side surface of the core, and extends over an entire length of the first portion. The dust suction passage extends through the core in the axial direction.

11 Claims, 3 Drawing Sheets

(51) Int. Cl.
*B28D 7/02* (2006.01)
*B25D 17/02* (2006.01)
*B23B 51/02* (2006.01)
*B23B 51/06* (2006.01)

(52) U.S. Cl.
CPC ............... *B25D 17/20* (2013.01); *B28D 7/02* (2013.01); *B23B 2226/75* (2013.01); *B23B 2251/241* (2013.01); *B23B 2251/406* (2013.01); *B23B 2251/50* (2013.01); *B25D 2250/111* (2013.01); *B25D 2250/211* (2013.01)

(58) Field of Classification Search
USPC .......................................... 175/213, 417–419
See application file for complete search history.

(56) References Cited

U.S. PATENT DOCUMENTS

| | | | | |
|---|---|---|---|---|
| 2,028,580 | A * | 1/1936 | Yedd | B25D 17/02 |
| | | | | 175/213 |
| 2,733,943 | A * | 2/1956 | Nater | E21B 10/445 |
| | | | | 175/323 |
| 4,314,616 | A | 2/1982 | Rauckhorst et al. | |
| 4,711,609 | A * | 12/1987 | Seefluth | B23B 51/0413 |
| | | | | 175/213 |
| 5,984,596 | A | 11/1999 | Fehrle et al. | |
| 6,290,002 | B1 | 9/2001 | Comeau et al. | |
| 6,533,047 | B2 * | 3/2003 | Kleine | B23B 51/06 |
| | | | | 173/198 |
| 7,563,060 | B2 * | 7/2009 | Kesterson | B23B 51/06 |
| | | | | 175/213 |
| 2003/0068209 | A1 * | 4/2003 | Leibhard | E21B 10/58 |
| | | | | 408/231 |
| 2010/0003097 | A1 * | 1/2010 | Kitsukawa | B23B 51/06 |
| | | | | 408/207 |
| 2012/0285749 | A1 * | 11/2012 | Bohn | B23B 51/06 |
| | | | | 175/393 |
| 2013/0266386 | A1 | 10/2013 | Miyanaga | |

FOREIGN PATENT DOCUMENTS

| | | |
|---|---|---|
| CN | 103038033 A | 4/2013 |
| EP | 0321673 A2 | 6/1989 |
| EP | 2572849 A1 | 3/2013 |
| JP | 10-217238 | 8/1998 |
| JP | 2006-289544 A | 10/2006 |
| JP | 3895904 B2 | 3/2007 |
| JP | 2008178941 A * | 8/2008 |
| WO | WO-01/36163 A1 | 5/2001 |
| WO | WO-2001/36163 | 5/2001 |
| WO | WO-2011/145270 A1 | 11/2011 |
| WO | WO-2012/154644 A1 | 11/2012 |

OTHER PUBLICATIONS

International Search Report for PCT/JP2015/001837, dated May 19, 2015.

Supplementary Search Report for European Patent Application No. EP 15 78 0306, dated Oct. 18, 2017.

* cited by examiner

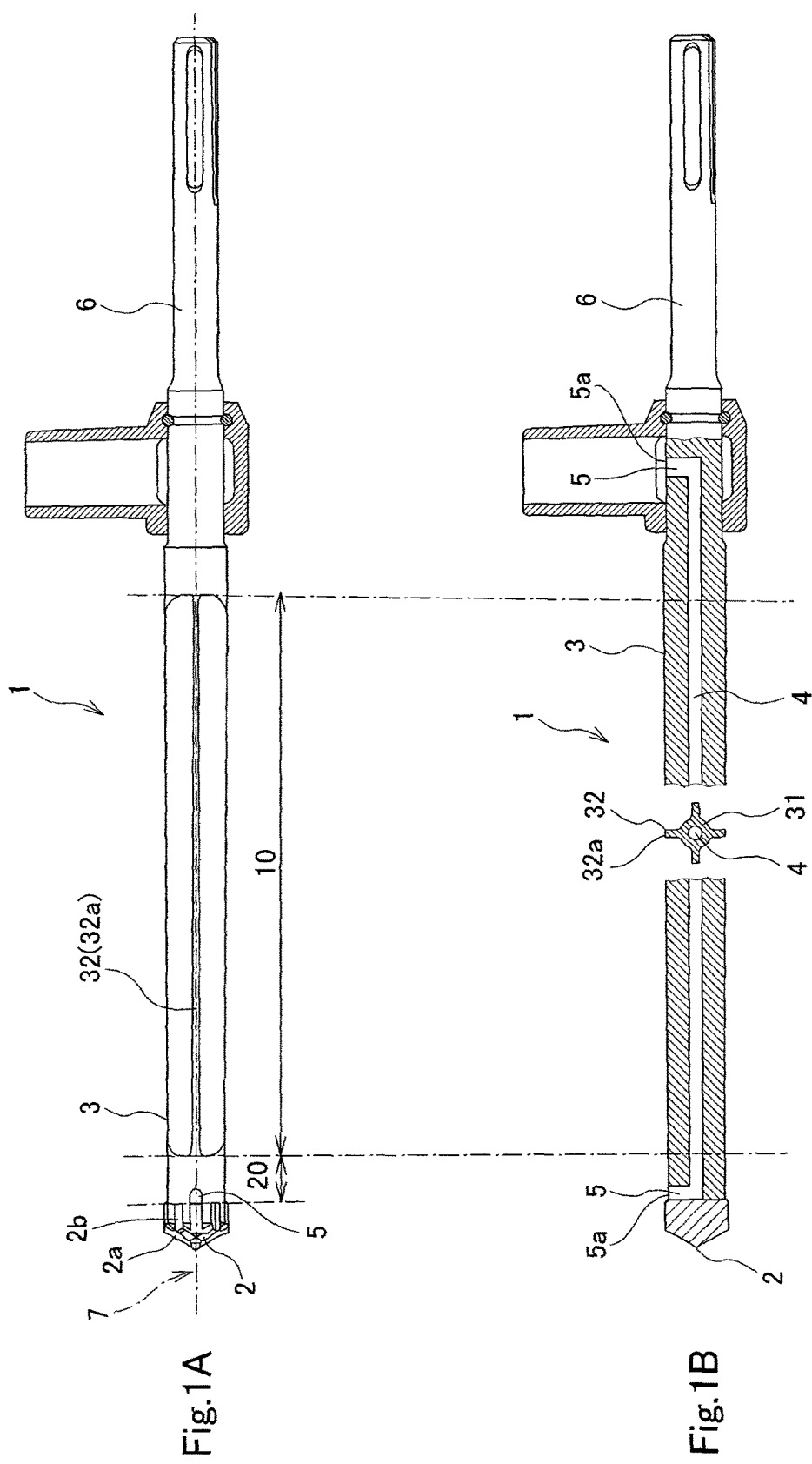

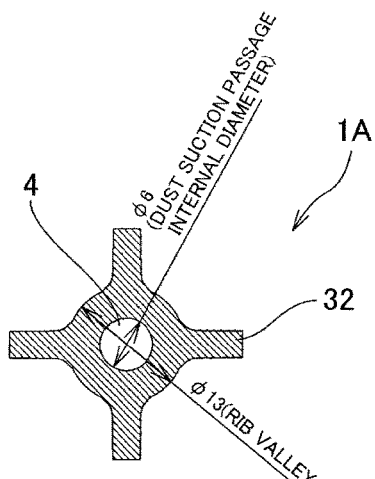
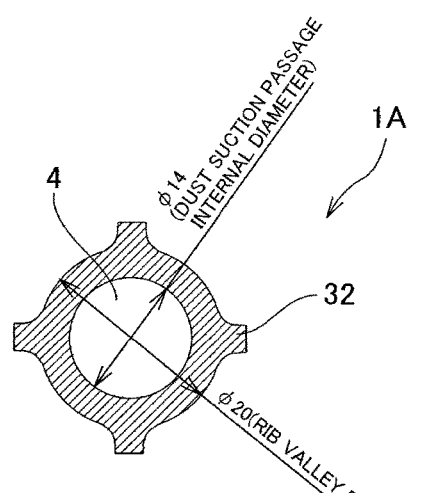
Fig.2A  Fig.2B
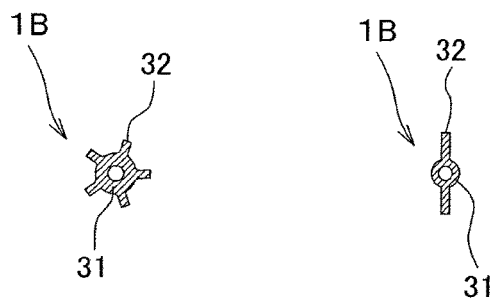
Fig.3A  Fig.3B
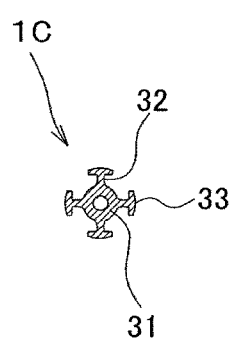
Fig.4

＃ DRILL BIT

TECHNICAL FIELD

The present invention relates to a drill bit suitable for drilling a hole in concrete, stone, or the like.

BACKGROUND ART

In the case of performing drilling work of drilling a hole in concrete, stone, or the like, a drill bit is used as a drilling tool. The drill bit is mainly attached to an electric tool, such as a hammer drill. In the drilling work, striking force and a rotational torque are both applied to the drill bit at the same time, the striking force being applied by a hammer in a central axis direction, and thereby a hole is drilled.

The drill bit is provided with a dust suction passage formed therein. The dust suction passage serves to discharge swarf generated during the drilling work through a swarf hole while performing cutting work.

CITATION LIST

Patent Literature

PTL 1: International Publication No. WO2011/145270

SUMMARY OF INVENTION

Technical Problem

However, in the case of a conventional drill bit, since the weight of the drill bit is heavy, the efficiency of work using the drill bit is poor. In addition, drilling a hole with such a conventional drill bit is time consuming since the striking efficiency of the hammer against the drill bit in the drilling work is low. Also for this reason, there is a problem of poor efficiency. In order to solve these problems, the external diameter of the drill bit may be reduced to reduce the weight. In this case, however, if the dimensional difference between the diameter of a hole to be drilled and the external diameter of the drill bit is great, the drill bit tends to tilt during the drilling work. As a result, the drilled hole is formed as a non-straight hole, causing degradation in machining precision, which is another problem.

The present invention has been made to solve the above-described problems. An object of the present invention is to realize weight reduction of a drill bit without causing degradation in the machining precision of a drilled hole.

Solution to Problem

A drill bit according to one aspect of the present invention includes: a pointed head including a plurality of cutting edges, which are arranged in a radial manner with respect to a central axis; a bit shaft provided with the pointed head at its distal end; a dust suction passage formed in the bit shaft and extending in an axial direction; and a hole with an opening, the hole being formed in the pointed head or in a portion of the bit shaft, the portion being near the distal end of the bit shaft. The hole is in communication with the dust suction passage. The bit shaft includes a first portion, the first portion including a core and a rib. The core extends in the axial direction, and is thinner than the pointed head. The rib protrudes radially outward from a side surface of the core, and extends over an entire length of the first portion. The dust suction passage extends through the core in the axial direction.

According to the above configuration, the first portion of the bit shaft includes: the core, which is thinner than the pointed head; and the rib, which protrudes radially outward from the side surface of the core. Accordingly, compared to a conventional drill bit, weight reduction is realized owing to the presence of a space formed between a part of the side surface of the core, on which part the rib is not present, and a radial position of a radially outer end surface of the rib. As a result, the weight of the entire drill bit is reduced.

In the above-described aspect, a radial position of a radially outer end surface of the rib may be substantially equal to a radial position of an outer peripheral surface of the pointed head.

According to the above configuration, since the dimension of the external diameter of the bit shaft is substantially equal to the dimension of the external diameter of the pointed head, tilting of the drill bit during drilling work can be suppressed, which makes it possible to prevent degradation in the machining precision of a drilled hole.

In the above-described aspect, the first portion may include a plurality of the ribs, and the plurality of the ribs may be arranged in a circumferential direction such that the ribs are spaced apart from each other.

According to the above configuration, shaft vibration of the drill bit during the drilling work is suppressed.

In the above-described aspect, the plurality of the ribs may be arranged in the circumferential direction at regular angular intervals.

According to the above configuration, since the ribs of the bit shaft are arranged uniformly in the circumferential direction, shaft vibration of the drill bit during the drilling work is suitably suppressed.

In the above-described aspect, the rib may extend over the entire length of the first portion without twisting with respect to the central axis.

According to the above configuration, the rib can be readily formed on the drill bit.

In the above-described aspect, the rib may extend over the entire length of the first portion in a spiral manner with respect to the central axis.

According to the above configuration, the rib is present fully circumferentially on the bit shaft. As a result, the rotation of the drill bit is stabilized.

In the above-described aspect, the rib may include an expanding portion at its radially outer end portion, the expanding portion expanding in a circumferential direction.

According to the above configuration, the area of the rib in the circumferential direction is increased. This makes it possible to suppress shaft vibration of the drill bit during the drilling work. Consequently, the rotation of the drill bit is further stabilized.

In the above-described aspect, an internal diameter of the dust suction passage may be not less than 10% and not more than 60% of a cutting edge diameter of the cutting edges of the pointed head.

According to the above configuration, the internal diameter of the dust suction passage is set to be within an optimal range relative to the dimension of the external diameter of the pointed head, which is substantially equal to the dimension of the external diameter of the bit shaft. In this manner, not only by the weight reduction owing to the presence of the space on the part of the side surface of the core, on which part the rib is not present, but also by increasing the internal diameter of the dust suction passage, the weight of the entire drill bit can be further reduced compared to a conventional drill bit.

In the above-described aspect, the bit shaft may include a second portion sandwiched between the pointed head and the first portion; on an outer peripheral surface of the second portion, there may be no portion protruding radially outward from an outer peripheral surface of a columnar body that is concentric with the pointed head and whose diameter is substantially the same as that of the pointed head; at least a part of the outer peripheral surface of the second portion may coincide with a part of the peripheral surface of the columnar body, which is concentric with the pointed head and whose diameter is substantially the same as that of the pointed head; and the opening of the hole may be formed in the pointed head or in the second portion.

The above configuration makes it possible to increase the strength of the pointed head near the cutting edges, and thereby the pointed head can bear the drilling work for a long period of time.

In the above-described aspect, the second portion may be a columnar portion that is concentric with the pointed head and whose diameter is substantially the same as that of the pointed head.

The above configuration makes it possible to further increase the strength of the pointed head near the cutting edges, and thereby the pointed head can bear the drilling work for a long period of time.

Advantageous Effects of Invention

According to the present invention, the weight of the drill bit can be reduced. Accordingly, the efficiency of work using the drill bit can be improved. In addition, tilting of the drill bit during drilling work can be prevented, which makes it possible to prevent degradation in the machining precision of a drilled hole.

BRIEF DESCRIPTION OF DRAWINGS

FIG. 1A is a plan view of a drill bit according to Embodiment 1 of the present invention.

FIG. 1B is a longitudinal sectional view of the drill bit according to Embodiment 1 of the present invention.

FIGS. 2A and 2B are cross-sectional views each showing a bit shaft of a drill bit according to Embodiment 2 of the present invention, the views each showing the internal diameter of a dust suction passage and a diameter measured at valley portions between ribs.

FIGS. 3A and 3B are cross-sectional views each showing a bit shaft of a drill bit according to Embodiment 3 of the present invention.

FIG. 4 is a cross-sectional view of a bit shaft of a drill bit according to Embodiment 4 of the present invention.

DESCRIPTION OF EMBODIMENTS

Figure 5A:
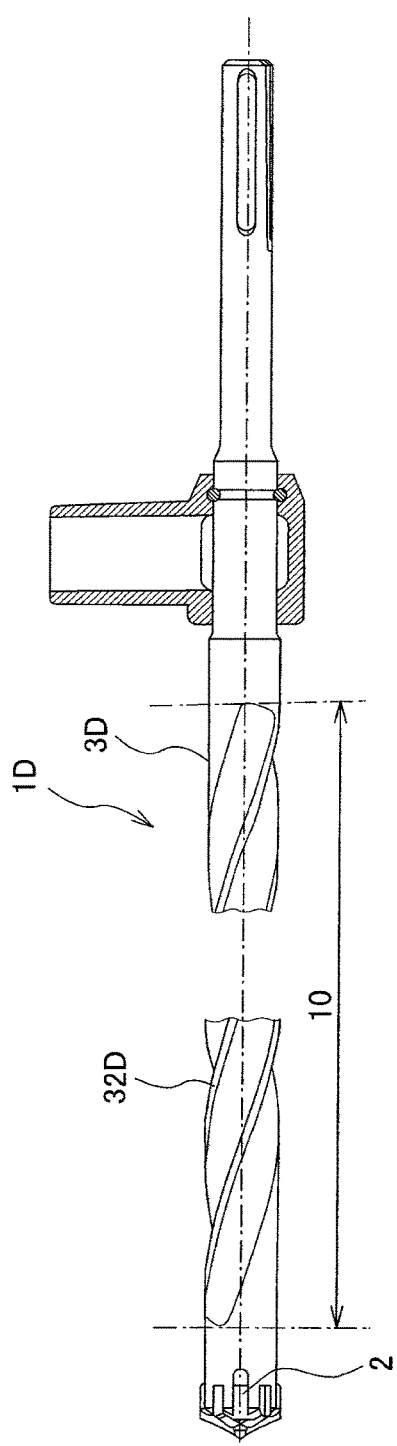
FIGS. 5A and 5B are plan views each showing a drill bit according to Embodiment 5 of the present invention.

Hereinafter, embodiments of the present invention are described with reference to the drawings. In the drawings, the same or corresponding elements are denoted by the same reference signs, and repeating the same detailed descriptions is avoided below.

Embodiment 1

FIG. 1A is a plan view showing one example of the configuration of a drill bit according to the present invention. FIG. 1B is a longitudinal sectional view of the drill bit according to the present invention. It should be noted that, in FIGS. 1A and 1B, the direction parallel to the central axis of the drill bit is defined as an "axial direction"; the direction perpendicular to the central axis of the drill bit is defined as a "radial direction"; and the direction along an arc whose center is the central axis of the drill bit is defined as a "circumferential direction". For the sake of convenience of the description, the "axial direction" is referred to as a front-rear direction in some cases. In these cases, the shape of each component of the drill bit and positional relationships among these components are described assuming that, with respect to the drill bit, the direction in which a pointed head is present is referred to as a front direction, and the direction opposite thereto is referred to as a rear direction.

As shown in FIG. 1A, a drill bit 1 includes a pointed head 2 and a bit shaft 3.

The pointed head 2 is provided at the front end of the drill bit 1. The pointed head 2 is provided with a plurality of cutting edges 2a, which are arranged in the circumferential direction, such that the cutting edges 2a are arranged in a radial manner when seen from the front, and such that the cutting edges 2a extend diagonally rearward when seen from the side. In drilling work, the cutting edges 2a come into contact with a surface of concrete, stone, or the like to be cut, and striking force is applied to the drill bit 1, so that the cutting edges 2a cut into the surface to be cut. The cutting edges 2a are made of, for example, a superalloy in order to have abrasion resistance.

The bit shaft 3 is joined to the rear end of the pointed head 2. The bit shaft 3 is formed in a substantially cylindrical shape. The rear end of the bit shaft 3 is provided with a shank 6 for connecting the bit shaft 3 to a drive shaft of an electric tool such as a hammer drill. The shank 6 is supported by a chuck mounted to the drive shaft of the hammer drill.

As shown in FIG. 1B, a dust suction passage 4 is formed inside the bit shaft 3. In this example, the dust suction passage 4 has a round cross section, and is a columnar space extending in the axial direction. The dust suction passage 4 is a passage for allowing swarf and the like to pass through, which are generated during hole machining (cutting) when drilling a hole in concrete, stone, or the like. A hole 5 with an opening 5a is formed near the distal end of the bit shaft 3 and also formed in the rear part of the bit shaft 3. These holes 5 are in communication with the dust suction passage 4. The opening 5a of the hole 5 near the distal end of the bit shaft 3 is an opening through which the swarf and the like generated during the cutting enter the inside. The opening 5a of the hole 5 in the rear part of the bit shaft 3 is an opening for discharging the swarf and the like to the outside of the drill bit 1.

In this example, the pointed head 2 and the bit shaft 3 are joined together by a welding method that uses heat generated by electrical resistance. However, the method of joining the pointed head 2 and the bit shaft 3 together is not limited to the welding method utilizing electrical resistance. Alternatively, for example, the pointed head 2 and the bit shaft 3 may be joined together by braze welding or welding using laser light. Further alternatively, the pointed head 2 and the bit shaft 3 may be fixed together by using an adhesive or the like.

As shown in FIGS. 1A and 1B, the bit shaft 3 includes a first portion 10 and a second portion 20. The first portion 10 means a portion that extends over almost the entire length of the bit shaft 3 in the axial direction. The second portion 20 means a portion that is positioned between the pointed head 2 and the first portion 10. The first portion 10 includes a core 31 and a plurality of ribs 32. The core 31 extends in the axial direction, and is formed in a substantially cylindrical shape thinner than the pointed head 2. The dust suction passage 4 extends through the core 31 in the axial direction. The ribs 32 protrude radially outward from the side surface (outer peripheral surface) of the core 31. The ribs 32 have radially outer end surfaces 32a, respectively. The radial position of each of the radially outer end surfaces 32a is substantially equal to the radial position of the outer peripheral surface of the pointed head 2.

That is, the first portion 10 of the bit shaft 3 includes: the core 31 thinner than the pointed head 2; and the ribs 32, each of which protrudes from the side surface of the core 31 to the radial position that is substantially equal to the radial position of the outer peripheral surface of the pointed head 2. Accordingly, compared to a conventional drill bit, weight reduction is realized owing to the presence of a space formed between a part of the side surface of the core 31, on which part the ribs 32 are not present, and the radial position of the radially outer end surface of each rib, which is substantially equal to the radial position of the outer peripheral surface of the pointed head 2. As a result, the weight of the entire drill bit 1 is reduced.

In addition, since the dimension of the external diameter of the bit shaft 3 is substantially equal to the dimension of the external diameter of the pointed head 2, tilting of the drill bit 1 during the drilling work can be suppressed, which makes it possible to prevent degradation in the machining precision of the drilled hole.

In this example, the plurality of ribs 32 (in FIG. 1B, four) are arranged at regular angular intervals (in this example, 90°) in the circumferential direction of the core 31. Since the bit shaft 3 includes the plurality of ribs 32, shaft vibration of the drill bit during the drilling work is suppressed. In addition, since the plurality of ribs 32 are arranged uniformly at regular angular intervals, shaft vibration of the drill bit is suitably suppressed.

In this example, the ribs 32 linearly extend over the entire length of the first portion 10 in parallel to the central axis 7 (i.e., in a non-twisted manner). According to this configuration, the ribs 32 can be readily formed on the drill bit 1.

On the outer peripheral surface of the second portion 20, there is no portion protruding radially outward from the outer peripheral surface of a columnar body that is concentric with the pointed head 2 and whose diameter is substantially the same as that of the pointed head 2. In addition, at least a part of the outer peripheral surface of the second portion 20 (in this example, the entire outer peripheral surface of the second portion 20) coincides with a part of the peripheral surface of the columnar body, which is concentric with the pointed head 2 and whose diameter is substantially the same as that of the pointed head 2. Specifically, the second portion 20 is a columnar portion that is concentric with the pointed head 2 and whose diameter is substantially the same as that of the pointed head 2. This makes it possible to increase the strength of the pointed head 2 near the cutting edges 2a, and thereby the pointed head 2 can bear the drilling work for a long period of time. The opening 5a of one of the holes 5 is formed in the pointed head 2 or in the second portion 20.

Embodiment 2

A drill bit 1A according to Embodiment 2 is a result of modifying a part of the dust suction passage 4 of the drill bit 1 according to Embodiment 1. In the description below, a relationship between the size of the internal diameter of the dust suction passage 4 and weight reduction of the first portion 10 is described.

FIGS. 2A and 2B are cross-sectional views of the bit shaft 3 of the drill bit 1A according to Embodiment 2 of the present invention. The first portion 10 not only includes the core 31 and the ribs 32, but is configured such that the internal diameter of the dust suction passage 4 is set to be within an optimal range. In this manner, the weight of the first portion 10 can be further reduced. Consequently, the weight of the entire drill bit 1A is further reduced. Preferably, the internal diameter of the dust suction passage 4 is not less than 10% and not more than 60% of the cutting edge diameter of the cutting edges 2a of the pointed head 2. To be more specific, preferably, the ratio of a diameter measured at valley portions between the ribs 32 to the cutting edge diameter of the pointed head 2 is such that the diameter measured at the valley portions between the ribs 32 is not less than 30% and not more than 80% of the cutting edge diameter of the cutting edges 2a of the pointed head 2. Specifically, as shown in FIG. 2A, in a case where the cutting edge diameter of the pointed head 2 is 28 mm, the internal diameter of the dust suction passage 4 is preferably 6 mm, and the diameter measured at the valley portions between the ribs 32 is preferably 13 mm. Similarly, as shown in FIG. 2B, in the case where the cutting edge diameter of the pointed head 2 is 28 mm, the internal diameter of the dust suction passage 4 may be 14 mm, and the diameter measured at the valley portions between the ribs 32 may be 20 mm.

Embodiment 3

A drill bit 1B according to Embodiment 3 is a result of modifying a part of the drill bit 1 according to Embodiment 1. In the description below, differences of the drill bit 1B according to Embodiment 3 from the drill bit 1 according to Embodiment 1 are mainly described.

FIGS. 3A and 3B are cross-sectional views of the bit shaft 3 of the drill bit 1B according to Embodiment 3. As shown in FIGS. 3A and 3B, the number of ribs 32 protruding radially outward from the side surface of the core 31 is not limited to four, which is the case in Embodiment 1. Alternatively, the number of ribs 32 protruding radially outward from the side surface of the core 31 may be five or two. The number of ribs 32 is not particularly limited, but may be one or at least two. The more the number of ribs 32, the higher the stability of the rotation of the drill bit 1B, but the less the weight reduction effect of the drill bit 1B.

Embodiment 4

A drill bit 1C according to Embodiment 4 is a result of modifying a part of the drill bit 1 according to Embodiment 1. In the description below, differences of the drill bit 1C according to Embodiment 4 from the drill bit 1 according to Embodiment 1 are mainly described.

FIG. 4 is a cross-sectional view of the bit shaft 3 of the drill bit 1C according to Embodiment 4. As shown in FIG. 4, the ribs 32 may include expanding portions 33, which expand in the circumferential direction at respective radially outer end portions of the bit shaft 3. Except this point, Embodiment 4 is the same as Embodiment 1.

Embodiment 3 with the above configuration provides the same advantageous effects as those provided by Embodiment 1. In addition, since the expanding portions 33 are provided at the respective radially outer end portions of the ribs 32, the area of the ribs 32 in the circumferential direction is increased. This makes it possible to suppress shaft vibration of the drill bit 1C during the drilling work. Consequently, the rotation of the drill bit 1C is further stabilized.

Embodiment 5

A drill bit 1D according to Embodiment 5 is a result of modifying a part of the drill bit 1 according to Embodiment 1. In the description below, differences of the drill bit 1D according to Embodiment 5 from the drill bit 1 according to Embodiment 1 are mainly described.

Figure 5B:
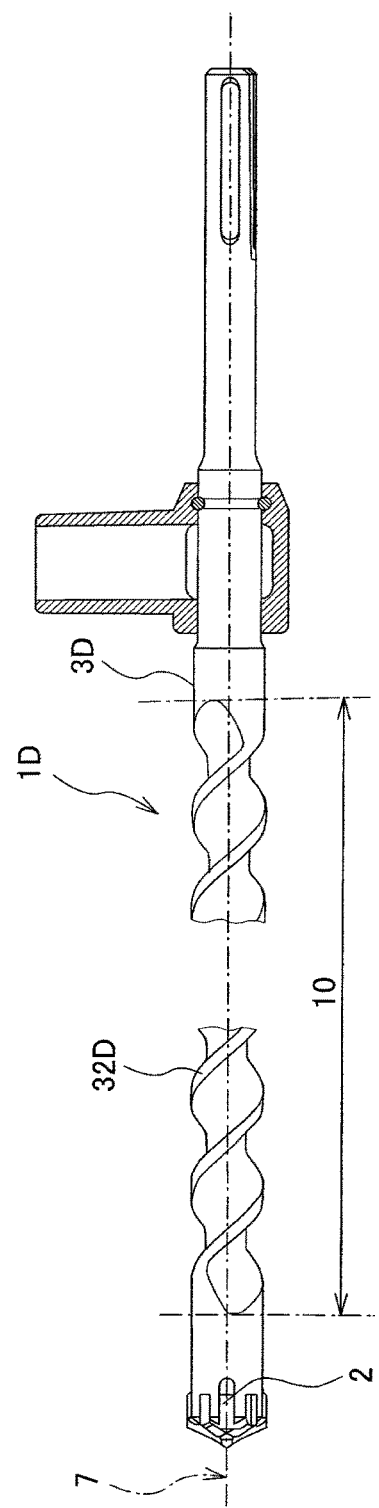

FIGS. 5A and 5B are plan views of the drill bit 1D according to Embodiment 5 of the present invention. As shown in FIG. 5A, ribs 32D extend in a spiral manner with respect to the central axis 7 over the entire length of the first portion 10 of a bit shaft 3D. According to this configuration, the ribs 32D are present fully circumferentially on the bit shaft 3. As a result, the rotation of the drill bit 1D is stabilized. Except this point, Embodiment 5 is the same as Embodiment 1.

As shown in FIG. 5B, the twist angle of the spirals of the ribs 32D may be increased. It should be noted that the dust suction passage 4 is provided inside the bit shaft 3D. Accordingly, swarf and the like generated during the drilling work are discharged to the outside not by the ribs 32D, but through the dust suction passage 4 from the hole 5 positioned at the rear of the bit shaft 3D.

It should be noted that, in the above-described embodiments (Embodiments 1 to 5), it is not essential that the ribs 32 be arranged at regular angular intervals.

In the above-described embodiments (Embodiments 1 to 5), the second portion 20 may be provided with the core 31 and the ribs 32.

In the above-described embodiments (Embodiments 1 to 5), each of the ribs 32 protrudes to the radial position that is substantially equal to the radial position of the outer peripheral surface of the pointed head 2. However, these embodiments are not limited to such a configuration. For example, each of the ribs 32 may be configured to protrude to a radial position that corresponds to about 70 to 90% of the radius of the outer peripheral surface of the pointed head 2.

INDUSTRIAL APPLICABILITY

The drill bit according to the present invention is applicable to drilling work of drilling a hole in concrete, stone, or the like.

REFERENCE SIGNS LIST

1, 1A, 1B, 1C, 1D drill bit
2 pointed head
2a cutting edge
3, 3D bit shaft
31 core
32, 32D rib
32a radially outer end surface
33 expanding portion
4 dust suction passage
5 hole
6 shank
10 first portion
20 second portion

The invention claimed is:

1. A drill bit comprising:
a pointed head including a plurality of cutting edges, which are arranged in a radial manner with respect to a central axis;
a bit shaft provided with the pointed head at its distal end;
a dust suction passage formed in the bit shaft and extending in an axial direction; and
a hole with an opening, the hole being formed in the pointed head or in a portion of the bit shaft, the portion being near the distal end of the bit shaft, wherein:
the hole is in communication with the dust suction passage;
the bit shaft includes a first portion, the first portion including a core and a rib;
the core extends in the axial direction, and is thinner than the pointed head;
the rib protrudes radially outward from a side surface of the core, and extends over an entire length of the first portion;
wherein the dust suction passage extends through the core in the axial direction; and
wherein the rib includes an expanding portion at its radially outer end portion, the expanding portion expanding in a circumferential direction.

2. The drill bit according to claim 1, wherein
a radial position of a radially outer end surface of the rib is substantially equal to a radial position of an outer peripheral surface of the pointed head.

3. The drill bit according to claim 1, wherein
the first portion includes a plurality of the ribs, and
the plurality of the ribs are arranged in a circumferential direction such that the ribs are spaced apart from each other.

4. The drill bit according to claim 3, wherein
the plurality of the ribs are arranged in the circumferential direction at regular angular intervals.

5. The drill bit according to claim 1, wherein
the rib extends over the entire length of the first portion without twisting with respect to the central axis.

6. The drill bit according to claim 1, wherein
the rib extends over the entire length of the first portion in a spiral manner with respect to the central axis.

7. The drill bit according to claim 1, wherein
an internal diameter of the dust suction passage is not less than 10% and not more than 60% of a cutting edge diameter of the cutting edges of the pointed head.

8. A drill bit comprising:
a pointed head including a plurality of cutting edges, which are arranged in a radial manner with respect to a central axis;
a bit shaft provided with the pointed head at its distal end;
a dust suction passage formed in the bit shaft and extending in an axial direction; and
a hole with an opening, the hole being formed in the pointed head or in a portion of the bit shaft, the portion being near the distal end of the bit shaft, wherein:
the hole is in communication with the dust suction passage;
the bit shaft includes a first portion, the first portion including a core and a rib;
the core extends in the axial direction, and is thinner than the pointed head;
the rib protrudes radially outward from a side surface of the core, and extends over an entire length of the first portion;
wherein the dust suction passage extends through the core in the axial direction;

and wherein the bit shaft includes a second portion sandwiched between the pointed head and the first portion;
on an outer peripheral surface of the second portion, there is no portion protruding radially outward from an outer peripheral surface of a columnar body that is concentric with the pointed head and whose diameter is substantially the same as that of the pointed head;
at least a part of the outer peripheral surface of the second portion coincides with a part of the peripheral surface of the columnar body, which is concentric with the pointed head and whose diameter is substantially the same as that of the pointed head; and
the opening of the hole is formed in the pointed head or in the second portion.

9. The drill bit according to claim 8, wherein the second portion is a columnar portion that is concentric with the pointed head and whose diameter is substantially the same as that of the pointed head.

10. The drill bit according to claim 1, wherein:
the bit shaft includes a second portion sandwiched between the pointed head and the first portion;
on an outer peripheral surface of the second portion, there is no portion protruding radially outward from an outer peripheral surface of a columnar body that is concentric with the pointed head and whose diameter is substantially the same as that of the pointed head;
at least a part of the outer peripheral surface of the second portion coincides with a part of the peripheral surface of the columnar body, which is concentric with the pointed head and whose diameter is substantially the same as that of the pointed head; and
the opening of the hole is formed in the pointed head or in the second portion.

11. The drill bit according to claim 10, wherein the second portion is a columnar portion that is concentric with the pointed head and whose diameter is substantially the same as that of the pointed head.

* * * * *